April 6, 1954     E. WILDHABER     2,674,030
CUTTER FOR GENERATING TOOTHED FACE MEMBERS
Original Filed April 3, 1944     2 Sheets-Sheet 1
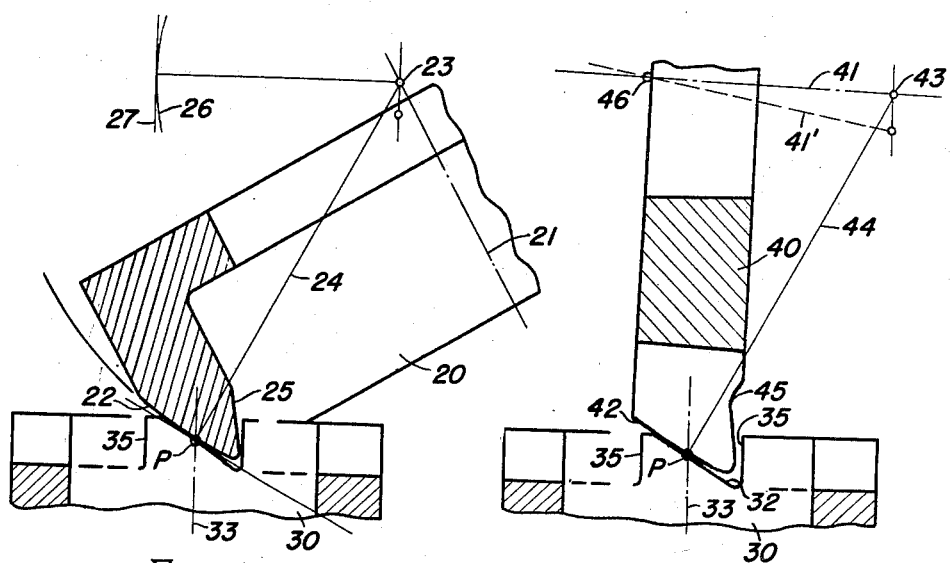
Fig. 1.
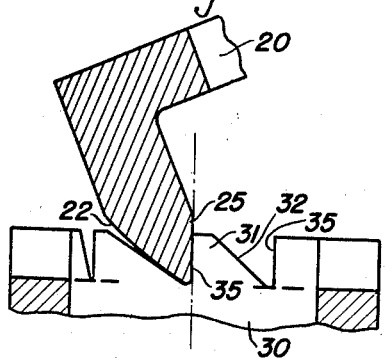
Fig. 2.
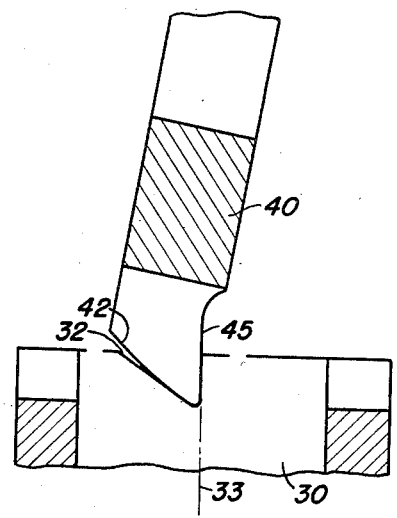
Fig. 3.
Fig. 4.
Inventor
ERNEST WILDHABER
By
                    Attorney April 6, 1954  E. WILDHABER  2,674,030
CUTTER FOR GENERATING TOOTHED FACE MEMBERS
Original Filed April 3, 1944  2 Sheets-Sheet 2

Inventor
ERNEST WILDHABER
By
[signature]
Attorney

Patented Apr. 6, 1954

2,674,030

UNITED STATES PATENT OFFICE 2,674,030

CUTTER FOR GENERATING TOOTHED FACE MEMBERS

Ernest Wildhaber, Brighton, N. Y., assignor to Gleason Works, Rochester, N. Y., a corporation of New York Original application April 3, 1944, Serial No. 529,337. Divided and this application March 1, 1949, Serial No. 79,000

14 Claims. (Cl. 29—103)

1

The present invention relates to tools for the production of toothed face members whose teeth have helical side surfaces on one or both sides thereof. More particularly, the invention relates to tools for the production of saw-tooth clutches, face ratchets, load-releasing clutches, and the like. This application is a division of my pending application Serial No. 529,337, filed April 3, 1944, and now Patent 2,464,913.

Heretofore, on account of the warped configuration of the surfaces, the helical sides of face clutch teeth and the like have had to be cut with a point-cutting tool, the tool being moved across the face of the work while a relative helical motion is produced between the tool and the work about and in the direction of the work axis. To obtain sufficiently smooth surfaces on the side of a tooth with such a tool, a great number of passes of the cutting tool must be made across the tooth surface from top to bottom thereof. In each pass the point of the cutting tool cuts only a line lengthwise of the clutch tooth. As a consequence the cutting time is comparatively slow. Moreover, the tool is subject to rapid wear because the finishing cuts on the tooth surface are all taken by a single point in the cutting tool.

The primary object of the present invention is to provide an improved form of cutting tool especially suited for cutting helical side tooth surfaces of toothed face members.

Another object of the invention is to provide an improved form of cutting tool, especially suited for practicing the process of my parent application Serial No. 529,337 and now Patent 2,464,913 above mentioned, which may be relieved in such way as to provide a constant cutting shape throughout its life.

Another object of the invention is to provide a side cutting tool for cutting helical sides of face clutch teeth and the like which because of its cutting action will have longer life and produce smoother tooth surfaces.

Still another object of the invention is to provide a cutting tool which may be employed in cutting saw-tooth face clutches and like parts which have helical side surfaces at one side only of their teeth, and which is suited to cut both sides of a tooth space in a single depthwise feed operation.

Other objects of the invention will be apparent hereinafter from the specification and from the recital of the appended claims.

In the process of the present invention as disclosed more fully in my parent application

2 above mentioned, the helical side of a tooth surface is cut by revolving a milling cutter in engagement with the work while a relative helical motion is effected between the cutter and work and while simultaneously a relative swinging motion is produced between the cutter and work about an axis inclined and preferably perpendicular to both the cutter and work axes. The swinging motion permits the side surface of the tool to generate the tooth surface to the full depth of the tooth.

The cutter may be of disc, dished or annular (face-mill) type. The cutting surface of the tool, which is adapted to cut the helical tooth sides, may be of either straight or of curved profile shape. Where a curved profile tool is employed it is preferably made of circular arcuate profile shape. The center of profile curvature may be on the tool axis or offset therefrom. In the former case, the active side surface of the tool is spherical, and in this case, the axis of swing of the tool will preferably be made to pass through the center of the spherical surface. The opposite side cutting surface of the tool may be of straight or curved profile.

In cutting a saw toothed face clutch with a tool made according to the present invention the helical side of a tooth space is finished with one side cutting surface of the tool, during feed and swing of the tool into depth, and, after the tool has reached full depth, the tool is allowed to dwell there long enough to finish the opposite side of the tooth space with the opposite side cutting surface of the tool.

In cutting or grinding load-releasing clutches which have teeth whose opposite sides are helical surfaces, a face mill cutter constructed according to the present invention is employed and the cutter is so positioned as to operate simultaneously in two spaced tooth zones of the work. One side of one tooth space is then cut on the in-feed of the tool and the opposite side of a tooth spaced from the first tooth is cut on the out-feed.

Cutters made according to the present invention may have widely different pressure angles on opposite sides. To maintain constant profile shape throughout the life of such tools, the blades of a cutter are preferably provided with a novel relief which is in a direction approximately bisecting the angle included between the opposite side-cutting edges of the tool.

In the drawings:

Fig. 1 is a fragmentary sectional view showing somewhat diagrammatically a face-mill cutter constructed according to one embodiment of this invention at one stage in the operation of cutting the helical side of a tooth of a saw tooth clutch member by the process of my parent application Serial No. 529,337;

Fig. 2 is a fragmentary sectional view showing the cutter at full depth cutting position at which it has completed the cutting of the helical side of a tooth space and is cutting the other non-helical side thereof;

Figure 5:
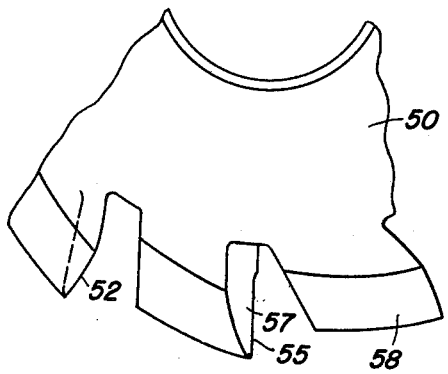
Figures 6, 7:
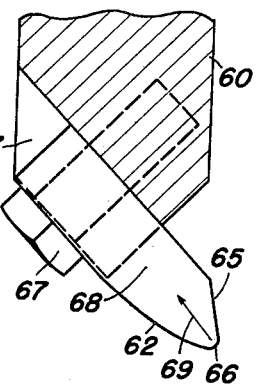
Figure 9:
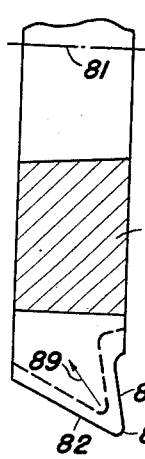
Figure 10:
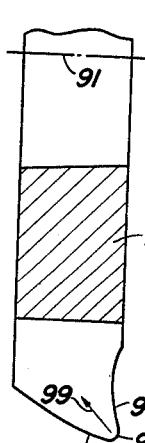
Figures 11, 12:
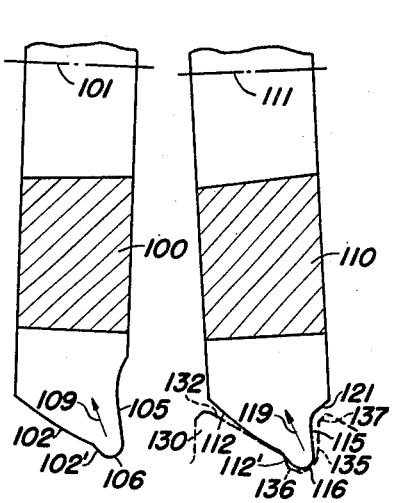

Figs. 3 and 4 are fragmentary sectional views corresponding to Figs. 1 and 2, respectively, and showing one form of disc milling cutter made according to the present invention for cutting a saw tooth clutch member, Fig. 3 showing the cutter at one stage of the operation of cutting of one side of the tooth space and Fig. 4 showing the cutter at full depth position where the cutting of the helical tooth side is complete and the cutting of the opposite side of the tooth space is being effected;

Figs. 5 and 6 are a fragmentary side elevation and a fragmentary axial sectional view, respectively, further illustrating the structure of the cutter shown in Figs. 3 and 4;

Fig. 7 is a fragmentary axial sectional view of a disc milling cutter made according to a different embodiment of the invention; and Figs. 8 to 12 inclusive are fragmentary axial sectional views of disc milling cutters made according to still further modifications of the invention, Fig. 12 illustrating diagrammatically, also, how the cutter of this figure may be employed to produce a saw tooth clutch member having rounded tooth bottoms and chamfered tooth tops.

Referring now to the drawings by numerals of reference, in Figs. 1 and 2 we have shown a rotary annular tool (face-mill cutter) 20 made according to one embodiment of the invention. This tool, which is illustrated somewhat diagrammatically, has its axis at 21. It has outside cutting edges which lie in a convex spherical surface 22 whose center is at 23 on the axis 21 of the tool. It has inside cutting edges 25 which are straight and inclined to the cutter axis 21, and which lie in a conical surface coaxial with the axis 21. 24 denotes a normal to the outside cutting surface of the tool.

Figs. 1 and 2 illustrate the use of the tool 20 in cutting the sides of the teeth of a saw tooth clutch member 30 according to the process of the present invention as more fully disclosed in my parent application above mentioned. The teeth of this clutch member are denoted at 31. The sides 32 of these teeth are helical surfaces and may be cut by rotating the cutter 20 on its axis 21 while a relative helical motion is produced between the cutter and the work about and in the direction of the axis 33 of the work while a relative swinging motion is produced between the cutter and the work about an axis passing through the sphere center 23. The axis of swing is here offset from and angularly disposed to the work axis.

Fig. 1 illustrates a position where contact between the outside cutting edges 22 of the tool and the helical tooth surface 32 is at a mean point P of the tooth surface 32. Fig. 2 shows a position where the cutter has reached full depth. The helical side surface 32 has here been completely generated and the driving side 35 of the adjacent clutch tooth is cut by allowing the cutter to dwell briefly in full depth position and clean up this side, as described in more detail in my parent application above mentioned.

When both members of the clutch pair or of a pair of face ratchets are cut in a manner described, they will engage with one another correctly on both sides. The meshing helical sides 32 of the teeth will have the lengthwise and profile contact which is desired and which is determined by the sphere radius of the outside cutting surface 22 of the cutter. The driving sides 35 of the teeth, will have their tooth ends eased off because the inside conical surfaces of the cutters will cut convex lengthwise shapes on both members.

Figs. 3 and 4 illustrate a cutter 40 made according to a different embodiment of the invention. This is a disc type cutter having its axis at 41. It has, however, the same general V-shape cutting profile as has the cutter 20 of Figs. 1 and 2. It has convex spherical cutting edges 42 at one side centered at 43 on the axis 41 of the cutter. It has a cutting surface 45 at its opposite side which is of straight profile and conical and slightly internal. In fact, the conical surface 45 is so slightly internal that in the area of cutting it differs only very slightly from a plane, the difference being just enough to produce the desirable amount of mismatch of the driving sides of the clutch or ratchet teeth at the outer and inner ends of the teeth. If no mismatch were desired, the cutting surface could be made plane perpendicular to the tool axis 41. 44 is a normal to the outside cutting surface of the tool.

It will be noted that in the embodiment illustrated the center 43 of the spherical convex cutting surface 42 lies on the axis 41 of the cutter beyond one side face of the cutter and beyond the plane which is adjacent said side face and which contains the tip cutting point of the tool.

The tool 40 is employed in the same way as the tool 20. It is rotated on its axis 41 in engagement with the work and simultaneously a relative helical motion is effected between the tool and the work about and in the direction of the work axis 33 while a relative swinging movement is produced between the tool and work about an axis passing through the sphere center 43 and preferably perpendicular to the plane of the drawing and also perpendicular to the work axis 33.

In the position shown in Fig. 3, the spherical cutting surface 42 of the tool has contact with the helical side tooth surface 32 being generated in a mean point P, while in the position shown in Fig. 4 the helical side surface 32 is completely generated and the driving side 35 of the tooth space is being finished. Here, the conical surface 45 of the tool will produce a longitudinally convex surface on the side 35 of the tooth, but the degree of convexity is fully under control and may be made such as to obtain a desirable amount of lengthwise tooth contact when the pair of engaging clutch or ratchet members are in mesh. Both clutch members may be made alike.

Ordinarily the speed of cutter rotation is independent of the helical and swinging movements. In some cases where high speed production is sought it may be desirable, however, to time the cutter rotation with the helical and swinging motions so that the same blade of the cutter may finish the driving side of all of the teeth of the clutch or ratchet member, to insure accurate tooth spacing. The swinging motion is timed with the depth feed motion, but the exact nature of the timing is relatively unimportant provided that it is the same for each tooth surface to be produced. The timing may be such that the cutter axis 41 or a line parallel to it continues to pass through a fixed point, such as the point 46, during the swinging motion. This is shown in Fig. 3 where 41' denotes another position of the tool axis 41.

The swinging motion and the depth feed, may, however, be timed to be in exact proportion to each other. In this case, a circle connected with the carrier, in which the cutter is journaled, will roll on a straight line parallel to the work axis. Such an embodiment is illustrated diagrammatically in Fig. 1 where 26 denotes the circle and 27 the line parallel to the work axis. Such timing may be effected, for instance, by use of a rack and gear or the equivalent thereof.

Cutters of the general character shown in Figs. 3 and 4 may be made in several forms as illustrated in Figs. 5 to 12 inclusive.

The cutter 50 shown in Figs. 5 and 6 is of the disc type and has a plurality of radially disposed cutting blades, each of which has a generally V-shaped cutting portion comprising a curved profile cutting edge 52 and a straight profile cutting edge 55. The straight profile cutting edges 55 are inclined at such an angle to the cutter axis 51 as to form a slightly internal conical cutting surface. The curved profile cutting edges 52 are of convex circular arcuate shape and have their centers on the cutter axis constituting, therefore, a spherical cutting surface. The two cutting surfaces 52 and 55 are connected by a rounded tip cutting portion 56.

The front cutting faces 57 of the cutting blades 58 of the cutter are preferably plane surfaces. In Fig. 5 the cutter is shown as having the front faces of alternate blades sharpened with opposite side rake so that one blade will have a side cutting edge 55 at one side and the next blade will have a side cutting edge 52 at the opposite side. This structure insures keener side cutting edges. Instead of so sharpening the cutter, however, its cutting faces may be sharpened all alike.

The cutting faces may be ground so that the cutting edges lie in planes containing the cutter axis 51, but it is preferred to provide each cutting face with a slight hook in addition to its side rake. By providing the blades with such a hook and also with a slight side rake favoring the side 55, all of the blades might be ground alike and the cutter would still have keen cutting action.

On form-relieved milling cutters constructed according to conventional design, the profile of the relieving tool is identical with the cutting profile which is to be relieved, that is, it is a counterpart of the profile of the cutter in an axial plane of the cutter. The face of the relieving tool is then a plane positioned to contain the cutter axis. The relieving motion is in said plane. When front rake or side rake is provided on the cutter, the face of the relieving tool may be made to coincide with the cutting face and the profile of the relieving tool is then made to conform to the cutting edge and differs from the cutting profile.

In the manufacture of cutters according to the present invention, the relief may be applied to each cutting surface by a single edged tool on a relieving lathe. A straight line relieving motion is then imparted to the tool as the cutter is turned on its axis. As in conventional practice, the relieving action is repeated for each cutting tooth or blade to be relieved as the blades rotate under the relieving tool. With the present invention, however, the relieving motion is in a direction, such as denoted by the arrow 59 (Fig. 6), which substantially bisects the angle of the basic V-shaped cutting profile, so as to insure approximately equal amounts of normal relief on the two sides of the blades. In all cases, the relieved surfaces are so shaped that the cutting profile remains the same during the whole life of the cutter. This is illustrated in Fig. 6 where a cutting profile, such as might be obtained after repeated sharpenings of the cutter, is shown in dotted lines. The cutting edges 52, 56 and 55 then assume the positions 52'', 56'' and 55'', respectively.

Fig. 7 shows a disc cutter 60 designed according to another embodiment of this invention and having inserted cutting blades 68 which are secured in slots 67 of the cutter head by bolts 67'. Such cutters may be used especially for cutting clutches of large size. Here again, the cutting profile of the blades in the axial section of the cutter is of general V-shape, the blades having side cutting edges 62 of circular arcuate shape centered on the cutter axis, side cutting edges 65 of straight profile shape inclined to the cutter axis, and connecting tip cutting edges 66 of curved shape. The side cutting edges 62 again constitute a spherical cutting surface; and the side cutting edges 65 again constitute a conical cutting surface coaxial with the cutter. The cutting blades are again relieved preferably in a direction bisecting the cutting profile as indicated by the arrow 69.

Figure 8:
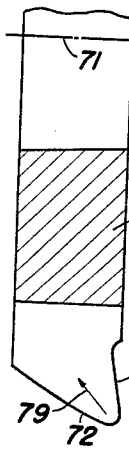

Still another form of cutter is shown in Fig. 8. Here the cutter 70 has a convex cutting side cutting edge 72 which is less curved than the edge 52 of the cutter 50 and which has its center beyond the cutter axis 71 so that the cutting surface is no longer a spherical surface. The opposite side cutting edge 75 may be, however, straight like the cutting edge 55. The blades of this cutter are relieved in a direction bisecting the angle between the sides 72 and 75 as indicated by arrow 79.

The cutter 80 of Fig. 9 has straight cutting profiles 82 and 85 at opposite sides constituting a V-shape cutting portion connected by the rounded tip portion 86. The axis of the cutter is at 81 and its blades are relieved in a direction bisecting the angle between opposite sides thereof as denoted by the arrow 89.

The cutter 90 of Fig. 10 has a convex cutting edge 92 on one side and a concave cutting edge 95 on the opposite side. These are connected by the rounded portion 96. The blades are relieved in the direction of the arrow 99 which bisects the side profile; and the axis of the tool is denoted at 91.

The cutter 100 of Fig. 11 has a convex cutting profile 102 which bulges out near its tip, as denoted at 102'. This is for the purpose of producing rounds in the bottoms of the tooth spaces of the clutch or ratchet member which is to be cut. The opposite side of the cutting portion of this tool is of straight profile as denoted at 105. The axis of the tool is at 101. The two side edges are joined by the round 106. The tool is relieved in the direction of the arrow 109 bisecting the angle between opposite side cutting edges of the blades.

Fig. 12 illustrates a still further embodiment of the invention in which a cutter 110 is shown which is similar to the cutter 100 of Fig. 11 except for the fact that a chamfering edge 121 is provided at the top of the straight cutting profile 115. The opposite cutting profile 112 is again of circular arcuate profile shape and again has a bulge near its tip denoted at 112'. The use of this cutter is illustrated diagrammatically in Fig. 12. It is shown in the operation of cutting the helical side 132 of a tooth of a clutch member 130. During the relative movement of the cutter to full depth position it will be swung, as in the previous embodiment of the invention, about an axis passing through the center of curvature of cutting side 112, and in this swinging motion the bulging portion 112' of the cutting edge will sweep out the rounded tooth space bottom 136. At the same time the chamfering edge 121 will chamfer the upper edge 137 of tooth side 135.

The blades of cutter 110 are preferably relieved in a direction approximately bisecting the angle included between the opposite side cutting edges 112 and 115 of the tool, as denoted by the arrow 119.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention what I claim is:

1. A disc milling cutter which has a plurality of cutting blades that have inside and outside cutting edges forming, respectively, an internal conical cutting surface at one side and an external spherical cutting surface at the opposite side, the tip and opposite side surfaces of each blade having relief back of the front face of the blade and being relieved in a direction bisecting the angle between the opposite sides thereof.

2. A disc milling cutter of the form-relieved type whose blades have opposite sides that are of positive pressure angle and negative pressure angle, respectively, the tip and opposite side surfaces of each blade having relief back of the front face of the blade and being relieved in a direction inclined to the opposite sides of the blade and to a plane perpendicular to the cutter axis.

3. A disc milling cutter having a plurality of cutting blades which have cutting edges at one side lying in a spherical surface centered on the axis of the cutter and cutting edges at the opposite side lying in a conical surface coaxial with the cutter axis, the tip and opposite side surfaces of each blade having relief back of the front face of the blade and being relieved in a direction approximately bisecting the angle between the opposite sides of the blade.

4. A face mill cutter having a plurality of cutting blades which have cutting edges at one side lying in a convex spherical surface centered on the axis of the cutter and cutting edges at the opposite side lying in a conical surface coaxial with the cutter axis, the tip and opposite side surfaces of each blade having relief back of the front face of the blade and being relieved in a direction approximately bisecting the angle between the opposite sides of the blade.

5. A milling cutter whose blades have cutting edges at one side that are convexly curved from top to bottom and cutting edges of straight profile on the opposite side, said opposite side cutting edges being inclined at an acute angle to one another, the tip and opposite side surfaces of each blade having relief back of the front face of the blade and being relieved in a direction approximately bisecting the angle between the opposite sides of the blade.

6. A milling cutter whose blades have cutting edges at one side that are convexly curved from top to bottom, that are centered on the axis of the cutter, and cutting edges of straight profile at the opposite side, that are inclined to the axis of the cutter, said opposite side cutting edges being inclined at an acute angle to one another, and the tip and opposite side surfaces of each blade having relief back of the front face of the blade and being relieved in a direction approximately bisecting the angle between the opposite sides of the blade.

7. A milling cutter whose blades have cutting edges at one side that are convexly curved from top to bottom, that are centered in a point lying at one side of a plane perpendicular to the cutter axis and containing tip points of the blades, and cutting edges of straight profile and negative pressure angle at the opposite side, that do not extend beyond said plane in the direction of said center.

8. A milling cutter whose blades have cutting edges at one side that are convexly curved from top to bottom, that are centered in a point lying at one side of a plane perpendicular to the cutter axis and containing tip points of the blades, and cutting edges of straight profile at the opposite side, that do not extend beyond said plane in the direction of said center, said opposite side cutting edges being inclined at an acute angle to one another, and the tip and opposite side surfaces of each blade having relief back of the front face of the blade and being relieved in a direction approximately bisecting the angle between the opposite sides of the blade.

9. A milling cutter whose blades have cutting edges at one side that are convexly curved from top to bottom, that are centered in a point lying at one side of a plane perpendicular to the cutter axis and containing tip points of the blades, and cutting edges of straight profile and negative pressure angle at the opposite side that lie at the opposite side of said plane from said center.

10. A milling cutter whose blades have cutting edges at one side that are convexly curved from top to bottom, that are centered in a point lying at one side of a plane perpendicular to the cutter axis and containing tip points of the blades, and cutting edges of straight profile at the opposite side that lie at the opposite side of said plane from said center, said opposite side cutting edges being inclined at an acute angle to one another, and the tip and opposite side surfaces of each blade having relief back of the front face of the blade and being relieved in a direction approximately bisecting the angle between the opposite sides of the blade.

11. A milling cutter for generating helical side tooth surfaces on face clutch members and the like, whose cutting blades have a cutting surface at one side that is of convex profile for the greater part of its height and that bulges out adjacent the tip of the cutter, and the blades having an opposite side cutting surface inclined at an acute angle to and being of different pressure angle than said cutting surface of convex profile, the tip and opposite side surfaces of each blade having relief back of the front face of the blade and being relieved in a direction approximately bisecting the angle between the opposite sides of the blade.

12. A milling cutter for generating the side tooth surfaces of saw-toothed face clutch members and the like, said cutter having a plurality of cutting blades which have opposite side cutting edges, the cutting edges at one side of the blades lying in a conical surface coaxial with the cutter and the cutting edges at the opposite side of the blades being of convex profile for the greater part of their heights and having bulges adjacent the tip of the cutter, the tip and opposite side surfaces of each blade having relief back of the front face of the blade and being relieved in a direction approximately bisecting the angle between the opposite sides of the blade.

13. A milling cutter for generating the side tooth surfaces of saw-toothed face clutch members and the like, whose blades have cutting edges at one side, that lie in a conical surface coaxial with the cutter, and cutting edges at their opposite sides that for the greater parts of their heights are of convex profile and lie in a spherical surface coaxial with the cutter but that bulge adjacent the tip of the cutter, the tip and opposite side surfaces of each blade having relief back of the front face of the blade and being relieved in a direction approximately bisecting the angle between the opposite sides of the blade.

14. A rotary milling cutter having a plurality of cutting blades that have front faces, tip surfaces, and opposite side surfaces, the opposite side surfaces of the blades having different angles of inclination to the axis of the cutter, and the tip and opposite side surfaces of each blade having relief back of the front face of the blade and being relieved in a direction approximately bisecting the angle between the opposite side surfaces of the blade.

References Cited in the file of this patent

UNITED STATES PATENTS

| Number | Name | Date |
|---|---|---|
| 432,499 | Unbehend | July 15, 1890 |
| 654,436 | Burnham | July 24, 1900 |
| 1,338,822 | Farnum | May 4, 1920 |
| 1,494,517 | Walter | May 20, 1924 |
| 1,686,054 | Wildhaber | Oct. 2, 1928 |
| 1,829,385 | Anheuser | Oct. 27, 1931 |
| 1,898,732 | Krohne | Feb. 21, 1933 |
| 1,899,023 | Earl | Feb. 28, 1933 |
| 2,114,793 | Bauersfeld | Apr. 19, 1938 |
| 2,270,003 | Head | Jan. 13, 1942 |
| 2,353,768 | Shlesinger | July 18, 1944 |
| 2,410,913 | Wildhaber | Nov. 12, 1946 |
| 2,456,842 | Rutbell | Dec. 21, 1948 |
| 2,464,913 | Wildhaber | Mar. 22, 1949 |
| 2,464,915 | Wildhaber | Mar. 22, 1949 |
| 2,586,451 | Wildhaber | Feb. 19, 1952 |

FOREIGN PATENTS

| Number | Country | Date |
|---|---|---|
| 514,462 | Great Britain | Dec. 16, 1930 |